BRIDGE TYPE MODULATOR WITH UNBALANCED INPUT AND LOAD CIRCUITS
Filed Dec. 30, 1966
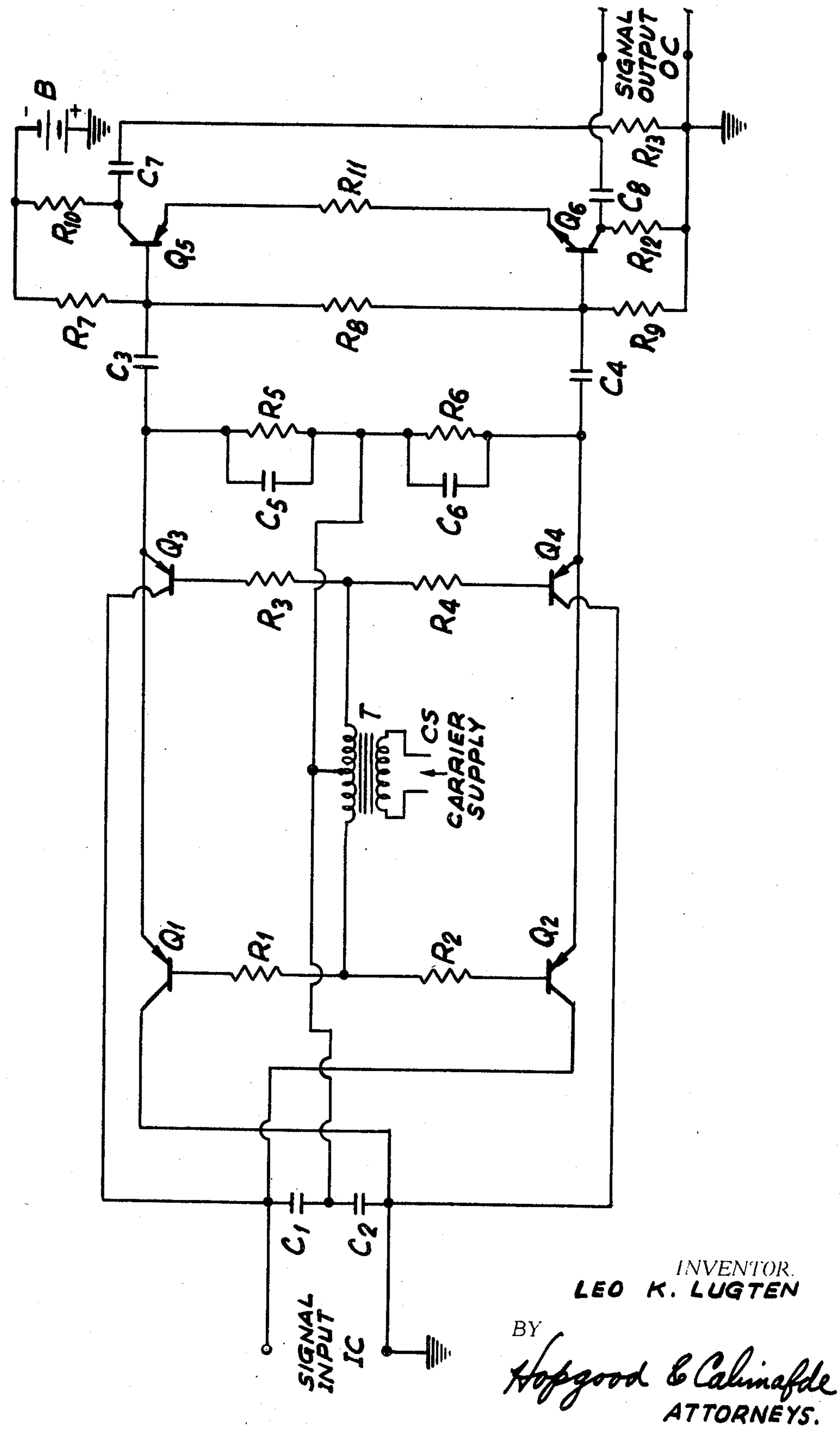
INVENTOR.
LEO K. LUGTEN
BY
Hopgood & Calimafde
ATTORNEYS.

United States Patent Office 3,514,721

Patented May 26, 1970

3,514,721

BRIDGE TYPE MODULATOR WITH UNBALANCED INPUT AND LOAD CIRCUITS

Leo K. Lugten, St. Petersburg, Fla., assignor to Electronic Communications, Inc.

Filed Dec. 30, 1966, Ser. No. 606,421
Int. Cl. H03c 1/54
U.S. Cl. 332—47 4 Claims

ABSTRACT OF THE DISCLOSURE

A modulator for unbalanced modulating input and load circuits includes a transistor switching bridge, the transistors of which are complementarily switched by a carrier signal. A pair of equal valued resistor-capacitor parallel networks are coupled in series on the output side of the bridge and a pair of equal valued capacitors are coupled in series on the input side of the bridge. A shunt joins the mid-point of the input capacitors and output RC networks, and balanced to unbalanced means, including a pair of complementary transistors, couple the output resistor-capacitor network to the load circuit.

This invention relates to a modulator device, and in particular, to a modulator of the transistor bridge type capable of operating between an unbalanced input and an unbalanced load.

Conventional modulators capable of operating in a described mode usually employ isolating transformers for input and output coupling. Since such transformers must be designed and produced rather carefully in order to accommodate the high frequencies with low leakage, low frequency selectivity and low distortion and further with careful balancing to eliminate undesirable modulation products, the transformers tend to be complex and expensive. Moreover, the transformer is generally the largest identifiable component in the network, and accordingly, contributes a considerable amount to the volume of the equipment.

Accordingly, it is the object of this invention to provide a modulator capable of operation between an unbalanced input and output without coupling transformers or other complex circuitry, yet with the feature of suppressing undesired modulation products.

It is a further object of this invention to satisfy the foregoing object with a modulator which is simple and inexpensive, and yet which is reduced in size with respect to conventional modulators employing transformers.

Briefly, the invention is predicated upon the concept of a modulator which, via capacitive balancing, suppresses odd order modulation products caused by even harmonics of the modulating signal mixing with the carrier.

By virtue of the inventive balancing, while undesired products are suppressed, the wanted sideband components are not. The accomplishment of this without transformers is extremely significant since other means of discrimination are, for practical purposes, obviated; the desired and undesired modulation components falling in band.

The above mentioned and other features and objects of this invention and the manner of attaining them will become more apparent and the invention itself will best be understood by reference to the following description of an embodiment of the invention taken in conjunction with the accompanying drawing wherein the single figure schematically illustrates one embodiment of the present invention.

Turning now to the figure, the modulating signal input IC is applied across equi-valued capacitors $C_1$ and $C_2$. As shown, both the input and the output are grounded, thereby effecting the described imbalance. The carrier signal CS is applied to the primary of a transformer T, the secondary of which is connected through resistors $R_1$ through $R_4$ arranged in a bridge circuit. The other ends of resistors $R_1$ through $R_4$ are coupled to the respective bases of transistors $Q_1$ through $Q_4$.

In the configuration shown, the carrier transformer T drives transistors $Q_1$, $Q_2$ and $Q_3$, $Q_4$ as conjugate pairs. Thus, in the first portion of the carrier cycle, transistors $Q_1$ and $Q_2$ will turn-on or conduct and $Q_3$ and $Q_4$ remain open, while carrier polarity reversal will cause transistors $Q_3$ and $Q_4$ to conduct, and transistors $Q_1$ and $Q_2$ to shut down.

The modulating signal, which may, for example, be any conventional modulating signal including D.C. (for illustrative purposes, it is assumed to be audio) is simultaneously applied to the collectors of diagonal bridge transistors. Opposite diagonal transistor collectors of transistors $Q_1$, $Q_4$ and $Q_2$, $Q_3$ are thus similarly affected by input signal excursions. Consequently, the input signal is chopped at the carrier rate and a modulated signal appears across the series RC circuits composed of $C_5$–$R_5$ in parallel with series with $C_6$–$R_6$ in parallel.

Capacitors $C_1$ and $C_2$ and $C_5$ and $C_6$ are small in value, thereby imposing substantially no effect on the low frequency modulating signal. Because, however, of the mid-point coupling between the input capacitors $C_1$ and $C_2$ and the output capacitors $C_5$ and $C_6$ and the transformer secondary a balanced bridge is formed for the high frequencies.

Thus, the described circuit functions similarly, with respect to modulation products, as would be achieved by conventional input and output balanced transformers, and the arrangement suppresses the odd order modulation products which are caused by even harmonics of the modulating signal mixing with the carrier.

The bridge output available across resistors $R_5$ and $R_6$ is fed via relatively large valued capacitors $C_3$ and $C_4$ to a balanced to unbalanced configuration which will now be described. $Q_5$ and $Q_6$ are characteristically similar complementary transistors (PNP-NPN) in an amplifying configuration. Each of the transistors is arranged to have the same collector impedance and accordingly, since the gain is the same, the transistors are running the same emitter current and therefore present the same base impedance to the respective capacitors $C_3$ and $C_4$.

Capacitor $C_7$ and resistor $R_{13}$ simulate the load. Thus, the complementary pair of transistors $Q_5$ and $Q_6$ present a balanced load to the switching (modulating) network, and yet sufficiently isolate the output which is available via capacitor $C_8$ across resistor $R_{12}$ so that the balanced to unbalanced conditions may be tolerated.

It has been found desirable to use germanium bridge transistors as opposed to silicon transistors as the former require less driving voltage to switch. Because of the driving voltage requirement, silicon transistors would necessitate the use of square waves which create additional problems in distributing such signals throughout the circuit.

Measurements taken of a circuit constituted by components having the parameters listed below have indicated a 20 db suppression improvement for the $C\pm 2M$ intermodulation product (where C is the carrier frequency and M is the modulating frequency). In the described arrangements, the $C\pm 2M$ was 70 db down with respect to $C\pm M$, the desirable sideband modulation products.

$R_1$, $R_2$, $R_3$, $R_4$—1.8K ohms
$R_5$, $R_6$—4.7K ohms
$R_7$, $R_9$—10K ohms
$R_8$—2.2K ohms
$R_{10}$, $R_{12}$, $R_{13}$—1.8K ohms
$R_{11}$—270 ohms $C_1$, $C_2$—100 pf.
$C_3$, $C_4$—2.2 mf.
$C_5$, $C_6$—50 pf.
$C_7$, $C_8$—2.2 mf.
Transistors $Q_1$, $Q_2$, $Q_3$, $Q_4$—2N965
$Q_5$, $Q_6$—2N2905; 2N2219
Carrier frequency—256 kHz.
Modulating frequency—Audio It may be seen that the novel arrangement according to the invention is capable of employment between unbalanced circuits yet presents the desired balanced configuration to undesired modulation products. Thus, a substantial improvement is achieved in undesired component rejection at a substantial saving in circuit volume.

While the principles of the invention have been described in connection with specific apparatus, it is to be clearly understood that this description is made only by way of example and not as a limitation to the scope of the invention as set forth in the objects thereof and in the accompanying claims.

What is claimed is:

1. A modulator for unbalanced modulating input and load circuits comprising a switching bridge including first and second pairs of series switches connected in parallel between said input and load circuits; means for complementary switching said switches with a carrier signal; a pair of equal valued resistor-capacitor parallel networks coupled in series on the output side of said switching bridge; a pair of equal valued capacitors coupled in series on the input side of said switching bridge; a shunt joining the midpoint of said input capacitors and output resistor capacitor networks; and balanced-to-unbalanced means coupling said resistor capacitor parallel network to said load circuit.

2. The modulator claimed in claim 1 wherein said means for complementary switching switches comprises a transformer, the primary of which is coupled to said carrier supply signal and the secondary of which is coupled to said switch, said shunt further joining the midpoint on the secondary of said transformer.

3. The modulator claimed in claim 1 wherein each of said switches comprises a transistor and wherein said means for complementary switching said switches comprises resistance means coupled to the respective transistor bases, and a transformer, the primary of which is coupled to said carrier signal and the secondary of which is coupled to said resistance means; said shunt further joining the midpoint of said transformer secondary.

4. The modulator claimed in claim 3 wherein said balanced-to-unbalanced means comprises a pair of complementary transistors connected with their collector emitter circuits in series, the bases of each of said transistors being coupled respectively across said series resistor-capacitor parallel networks.

References Cited

UNITED STATES PATENTS 3,010,079 11/1961 Straube ------------- 332—47

ROY LAKE, Primary Examiner

L. J. DAHL, Assistant Examiner

U.S. Cl. X.R.

332—43